July 6, 1937.  S. M. GODFREY  2,086,159
FISH SCALING MACHINE
Filed Aug. 21, 1935  3 Sheets-Sheet 2
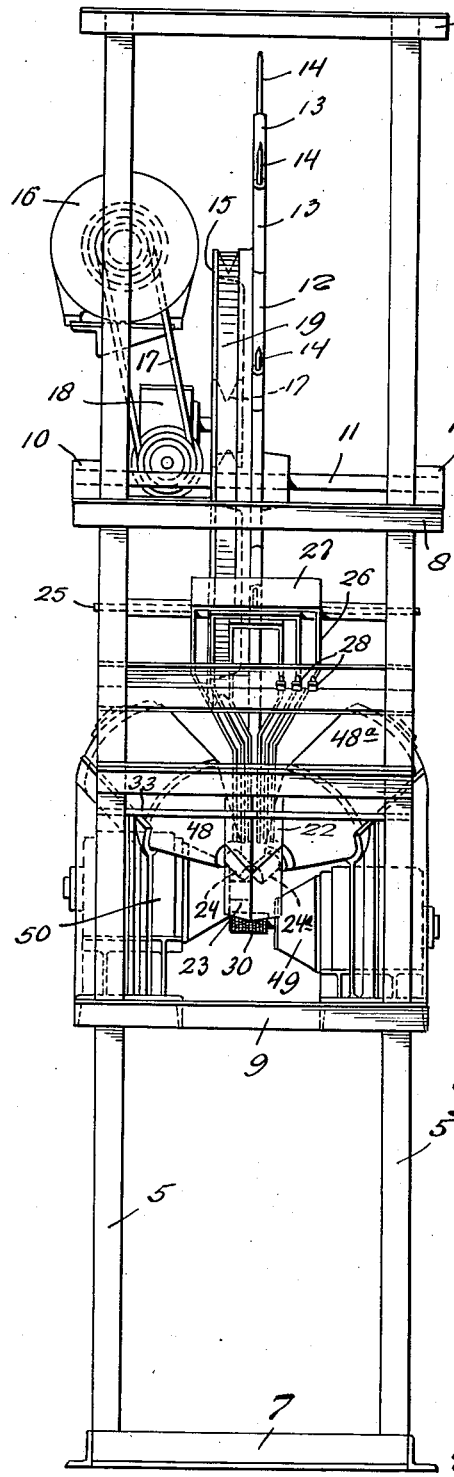
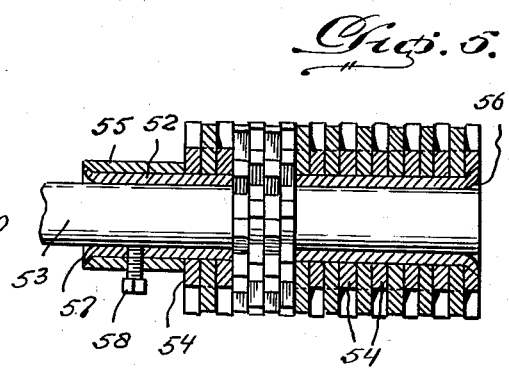
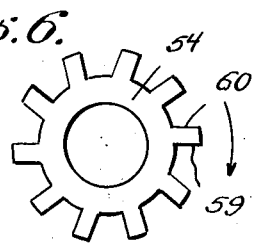
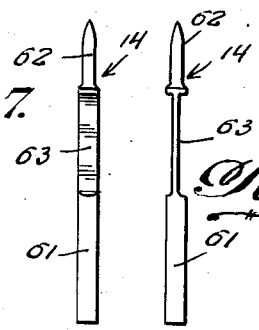
Inventor
Samuel M. Godfrey,
By J. Stanley Burch
Attorney July 6, 1937.　　　　S. M. GODFREY　　　　2,086,159
FISH SCALING MACHINE
Filed Aug. 21, 1935　　　3 Sheets-Sheet 3
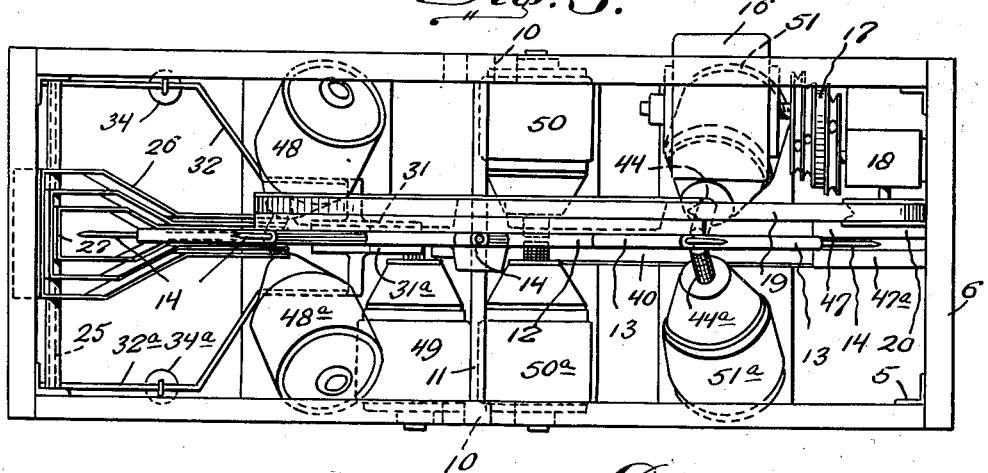
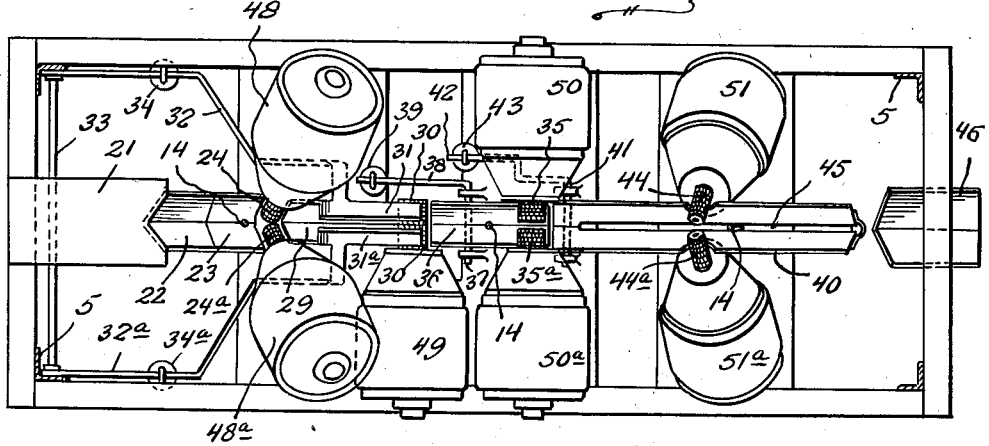
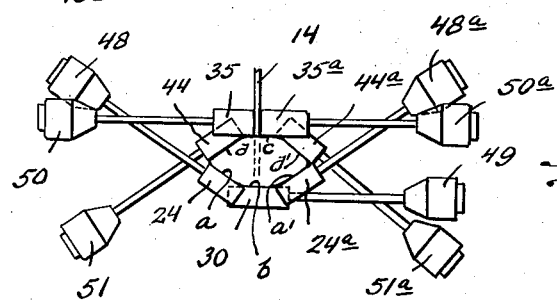
Inventor
Samuel M. Godfrey
By J. Stanley Burch
Attorney Patented July 6, 1937

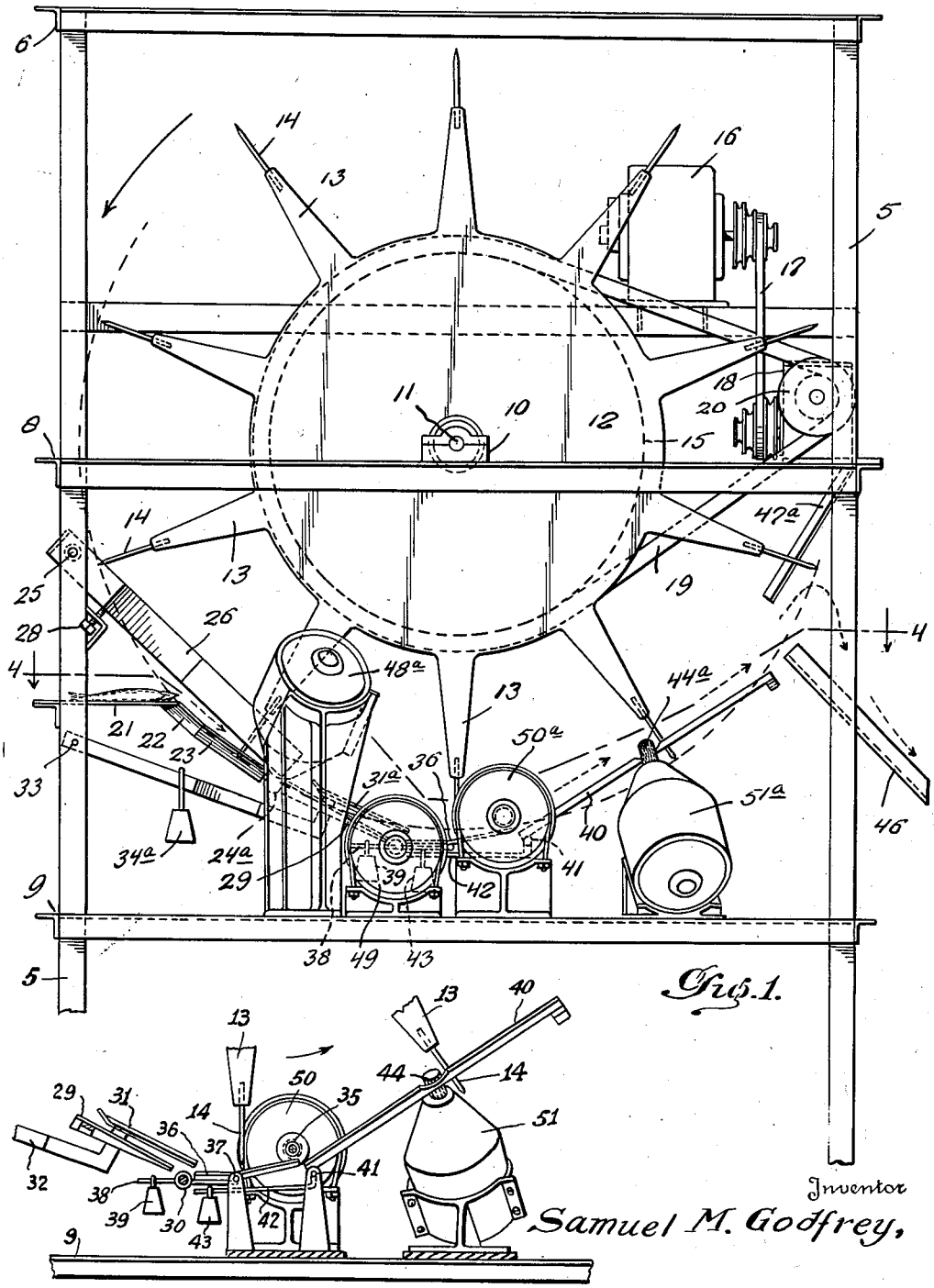

2,086,159

UNITED STATES PATENT OFFICE 2,086,159

FISH-SCALING MACHINE

Samuel M. Godfrey, Sharon, Pa.

Application August 21, 1935, Serial No. 37,236

7 Claims. (Cl. 17—5)

This invention relates to an improved machine for removing the scales from fish, and the primary object of the present invention is to provide a machine of this kind adapted to receive and effectively remove the scales from fish rapidly fed thereto, and to discharge the scaled fish at a convenient point for further operations, such as cutting, cleaning and packing.

A further object of the present invention is to provide a machine of the above kind embodying a novel form and arrangement of scale-removing elements adapted to remove the scales from all parts of a fish without destructive action upon the latter.

Other objects are to provide a machine of the above kind embodying novel and efficient means for conveying the fish past the scale-removing elements, and novel and efficient means for maintaining the fish in engagement with the scale-removing elements as it is conveyed past the latter.

Still another object of the present invention is to provide a machine of the above kind which is comparatively simple and compact in construction, efficient in operation, and easy to use or operate.

Other objects and features of the present invention will become apparent from the following description when considered in connection with the accompanying drawings, in which:

Figure 1 is a side elevational view, partly broken away, of a fish scaling machine constructed in accordance with the present invention.

Figure 2 is an end elevational view looking toward the right of Figure 1.

Figure 3 is a top plan view of the machine shown in Figure 1.

Figure 4 is a horizontal section on line 4—4 of Figure 1.

Figure 5 is a fragmentary enlarged detail view showing one of the scale-removing elements, partly in elevation and partly in longitudinal section.

Figure 6 is an elevational view of one of the toothed disks forming part of the scale-removing element shown in Figure 5.

Figures 7 and 7a show in fragmentary side and edge elevational views, respectively, a preferred form of fish-impaling spike employed in the construction of the fish conveying wheel of the present machine.

Figure 8 is a diagrammatic view illustrating the relative arrangement of the several scale-removing elements of the machine and showing how they cooperate in removing the scales from all parts of the body of the fish; and Figure 9 is a fragmentary view partly in section and partly in elevation, showing the arrangement of the yieldable fish-sustaining means forming part of the machine shown in Figure 1.

The present machine includes a suitable supporting frame which is shown of open rectangular form and constructed of angle iron members consisting of corner uprights 5 rigidly connected at the top and bottom and at spaced intermediate points by horizontal transverse and longitudinal members, as respectively indicated at 6, 7, 8 and 9. The longitudinal frame members at 8 carry transversely alined bearings 10 at points intermediate the ends of the supporting frame, in which is journaled the ends of a transverse horizontal shaft 11 upon the intermediate portion of which is secured a fish conveying wheel 12. As shown, the wheel 12 may be in the form of a disk having radial spokes 13 in the outer ends of which are secured radial outwardly projecting fish-impaling spikes 14. Rigidly carried by and arranged on one side of the wheel 12 is a relatively large pulley 15 forming part of power-operated means for rotating said wheel 12, which means further includes an electric motor 16 suitably mounted at one side of the supporting frame above the shaft 11 and operatively connected by a belt gearing generally indicated at 17 with the drive shaft of a speed reduction gearing at 18. The driven shaft of the speed reduction gearing 18 is in turn operatively connected with the wheel 12 by a belt gearing including the pulley 15, a drive belt 19, and another pulley 20 secured on the outer projecting end of the driven shaft of said speed reduction gearing 18. As shown, the belt gearing at 17 may provide for speed changing by including stepped pulleys on the power shaft of motor 16 and on the drive shaft of gearing 18 and reversely arranged as shown and in a generally well known manner.

Suitably supported at one end of the supporting frame is a horizontal feed plate 21 upon which the fish are successively placed while being fed to the machine. This feed plate is arranged considerably below the axis of wheel 12 and its inner edge terminates just outwardly of the path described by the outer pointed ends of spikes 14. Thus, when a fish is placed on the feed plate 21 so as to be lying on one side and with its head toward the inner edge of feed plate 21 and just in the path of the pointed outer ends of spikes 14, rotation of wheel 12 will cause one of its spikes 14 to engage and impale the head of the fish and convey it inwardly and downwardly for being scaled, in a manner and by means to be presently described.

Attached to the inner edge of feed plate 21 and extending downwardly and inwardly therefrom are trough members 22 and 23 arranged to engage the impaled fish and maintain it on the adjacent spike 14 of the fish conveying wheel 12 until said fish reaches the first of a series of scale-removing elements arranged to operate upon the body of the fish. The first scale-removing elements arranged to operate upon the body of the fish are indicated at 24 and 24a, and are disposed transversely of the machine at a downward and inward angle immediately at the inner end of the trough member 23. The scale-removing elements 24 and 24a are thus arranged to remove the scales from the lower side portions of the body of the fish along planes indicated at a and a' in Figure 8.

Carried by the supporting frame above the feed plate 21 is a transverse horizontal shaft 25 upon which the outer end of a plurality of arms 26 are pivoted, the outer ends of said arms being rigidly connected in nested pairs as indicated at 27, and suitably spaced. These arms 27 extend downwardly and inwardly and have their inner end portions disposed in adjacent parallel relation, with the innermost pair sufficiently spaced to permit the passage of the spikes 14 therebetween. These arms 26 lower by gravity and are of a length so that their extreme inner end portions will engage and rest upon the body of the fish directly above the scale-removing elements 24 and 24a so as to maintain the body of the fish in engagement with such scale-removing elements. Thus, the free inner ends of arms 26 will form an inverted trough where they engage the upper side of the body of the fish, and by connecting the weight arms 26 in pairs, they effectively prevent the fish from climbing or being displaced out of the trough members 22 and 23. It will be seen that both weight arms of each connected pair will be caused to simultaneously rise as the fish is fed thereunder. Thus, it is impossible for a weight arm on one side to rise and the associated weight arm on the other side to remain lowered, as would be the case with the use of disconnected weight arms. Hence the prevention of climbing or displacement of the fish laterally out of the trough members 22 and 23, as mentioned above. The lowering movement of arms 26 by gravity is properly limited by suitable set screws indicated generally at 28 in Figures 1 and 2, whereby the inner ends of said arms 26 will be prevented from lowering sufficiently to contact the scale-removing elements 24 and 24a.

The scale-removing elements 24 and 24a are arranged between the adjacent ends of the trough member 23 and another trough 29 which supports the fish in its travel from the scale-removing elements 24 and 24a to another or the next scale-removing element 30 arranged to operate upon the body of the fish. The scale-removing element 30 is arranged to remove the scales from the lower intermediate portion of the body of the fish along the plane indicated at b in Figure 8, thereby completing the entire removal of scales from the lower side of the body of the fish.

Spaced presser plates 31 and 31a are disposed above the trough 29 to hold the fish in the latter as it is conveyed along by the wheel 12 and to maintain it down in engagement with the scale-removing element 30 while the latter is operating upon the body of the fish. As shown, the presser plates 31 and 31a are carried by the inner ends of arms 32 and 32a whose outer ends are pivoted on a transverse horizontal shaft 33 carried by the supporting frame beneath the feed plate 21. Suitable weights 34 and 34a may be provided on the arms 32 and 32a if additional weight is desired for properly causing the plates 31 and 31a to exert the desired downward pressure upon the fish. Of course, a certain amount of pressure will be had by reason of the weight of the parts 31 and 31a and 32 and 32a, which freely lower by gravity.

From the scale-removing element 30, the fish passes to another pair of scale-removing elements 35 and 35a disposed transversely of the machine in slightly spaced end to end relation as shown in Figures 3, 4 and 8, the space between the adjacent ends of elements 35 and 35a being sufficient to permit the passage of the spikes 14 therebetween. It will be particularly noted that the elements 35 and 35a are horizontally arranged so as to operate upon and remove the scales from the upper intermediate portion of the body of the fish along the plane indicated at c in Figure 8.

A still further trough 36 is provided to support the fish as it is conveyed from the scale-removing element 30 to the scale-removing element 35 and 35a. This trough 36 is carried by a transverse rock shaft 37 having an arm 38 weighted as at 39, and one end of said trough 36 extends under the elements 35 and 35a and is normally swung upwardly by the arm 38 and weight 39. The trough 36 thus supports the fish as it travels to and under the elements 35 and 35a, pressing the fish upwardly against the latter elements while being operated on by the latter.

Still another trough 40 extends upwardly from the elements 35 and 35a to a point near the end of the machine opposite that at which the feed plate 21 is located. This trough 40 is attached at its inner lower end to another transverse rock shaft 41 having an arm 42 weighted as at 43 for normally causing the trough 40 to swing upwardly. Arranged at an upward and inward inclination intermediate the ends of trough 40 and so as to overlie the latter in adjacent end to end relation is a further and final pair of scale-removing elements 44 and 44a adapted to remove the scales from the upper side portions of the body of the fish along the planes indicated at d and d' in Figure 8, thereby completing the removal of the scales from all parts of the body of the fish. The trough 40 is yieldingly raised by the arm 42 and weight 43 so that the fish is yieldingly pressed into engagement with the elements 44 and 44a while being operated upon by the latter, at the same time sustaining the fish and maintaining it upon the particular spike 14 which has impaled the same. As this trough 40 extends through the path travelled by the outer ends of spikes 14, it is provided with a longitudinal slot 45 into and out of which the spikes 14 may freely pass without interference. Also, the space between the adjacent ends of the elements 44 and 44a is sufficient to permit the free passage of spikes 14 therebetween.

Arranged at the end of the machine adjacent the outer upper end of trough 40 is an outwardly and downwardly inclined discharge chute 46 arranged to receive the fish from the upper end of trough 40 and discharge it at a convenient point for further operations. A pair of spaced inwardly and downwardly extending plates 47 and 47a are carried by the end of the frame above the upper receiving end of chute 46. These plates are arranged with their lower ends in the path travelled by the outer ends of spikes 14, and so that the spikes pass therebetween. The plates 47 and 47a thus act as strippers for causing detachment of the fish from the spike 14 which has impaled the same, as said fish reaches a point above the receiving end of chute 46. Discharge of the fish from the conveyor wheel is thus positively insured, after the scaling operation has been completed.

Each scale-removing element has its own individual driving motor, and consists of a toothed cylinder secured on the armature or power shaft of such motor. The driving motors of elements 24 and 24a are respectively indicated at 48 and 48a; the driving motor of element 30 is indicated at 49; the driving motors of elements 35 and 35a are respectively indicated at 50 and 50a; and the driving motors of elements 44 and 44a are respectively indicated at 51 and 51a. As shown, the motors of these several scale-removing elements are carried by suitable mounts sustained by the longitudinal horizontal frame bars at 9, such mounts disposing the motors in the inclined or horizontal position required for the respective scale-removing elements. As will be clearly seen, the several motors are disposed at opposite sides of the supporting frame with the scale-removing elements secured on the projecting inner ends of the armature shafts of said motors.

As the scale-removing elements are all of similar construction, specific description of one will suffice for all. As shown in Figures 5 and 6, each scale-removing element preferably consists of a sleeve 52 adapted to snugly fit upon the projecting end of the power or armature shaft 53 of the associated motor, a plurality of toothed disks 54 fitted upon the sleeve 52 in contiguous side by side relation, and a collar 55 fitted on the inner end of sleeve 52 to maintain the disks 54 compacted between the outer end of collar 55 and the outwardly swaged or peened outer end of sleeve 52, the inner end of sleeve 52 also being outwardly swaged or peened against the inner end of collar 55 to maintain such compact relation of the toothed disks 54. The outwardly swaged or peened ends of sleeve 52 are indicated at 56 and 57, and a suitable set screw 58 may be threaded through the collar 55 and the adjacent end of sleeve 52 for non-rotatably securing the scale-removing element to and upon the armature or power shaft 53 while permitting its removal for renewal or sharpening. It will be particularly noted that the shaft 53 and sleeve 52 do not project beyond the outermost disk 54 thereby permitting the scale-removing elements which are associated in pairs to be closely related even though slightly spaced to permit the passage of the spikes 14 therebetween. The teeth of disks 54 have radial leading edges 59 and tangential rear or back edges 60, while said disks are arranged so that the teeth of each one are staggered with respect to the teeth of those on opposite sides thereof. By compactly arranging the disks 54 on the sleeve 52, sufficient frictional engagement is set up between said disks as to prevent relative turning thereof with respect to each other and said sleeve 52.

A preferred construction for the spikes 14 is shown in Figure 7 wherein the same embodies a cylindrical shank 61 and a relatively large pointed end portion 62 for impaling the fish, integrally connected by a relatively thin portion 63 which is flattened on opposite sides and adapted to pass between the scale-removing elements of each pair. This thin portion 63 permits arrangement of the scale-removing elements of each pair as close together as possible without interfering with the passage of the spikes therebetween.

In operation, the motor 16 and the several motors of the scale-removing elements are placed in operation so as to cause rotation of the spiked conveyor wheel 12 and rotation of the several scale-removing elements. The fish are then successively placed upon the feed plate 21 as indicated in Figure 1, with the head of the fish innermost and just projecting at the inner end of the plate 21. As the wheel 12 rotates, each spike thereof will impale the head of a fish and carry the latter downwardly and inwardly along the trough sections 22 and 23 to the scale-removing elements 24 and 24a and under the presser arms 26. From the scale-removing element 24 and 24a, the fish will be carried to and along the trough 29 and beneath the presser plates 31 and 31a over the scale-removing element 30. From the scale-removing element 30, the fish will be conveyed along the pivoted trough 36 to and under the scale-removing elements 35 and 35a, and then along the trough 40 under the scale-removing elements 44 and 44a, after which the completely scaled fish will be stripped from the associated spike 14 by the plates 47 and 47a so as to fall into the upper receiving end of chute 46. The scaled fish will then slide by gravity down the chute 46 to the desired point of discharge. The manner in which the several scale-removing elements are arranged and in which they operate upon the body of the fish having been previously explained, it will be seen that scales will be removed from all parts of the body of the fish, and due to the yielding presser arms and plates which sustain the fish and/or maintain engagement thereof with the scale-removing elements, the scale-removing operations will be rendered effective without danger of damage to the fish.

It will thus be seen that I have provided a machine which will successfully carry out the stated objects of the invention and which is of such construction as to meet with all of the requirements for a successful commercial use. Minor changes in details of construction illustrated and described are contemplated such as fairly fall within the spirit and scope of the invention as claimed.

What I claim as new is:

1. In a fish scaling machine, a series of scale-removing elements arranged to successively remove the scales from different portions of the body of a fish so as to conjointly act to remove the scales from all parts of the body of the fish, and means for conveying the fish to be scaled to and past the successive scale-removing elements, said last-named means comprising a power driven rotary conveying wheel mounted above said scale-removing elements and provided with radial fish impaling spikes, said scale-removing elements being disposed in an arcuate portion of a circular path in which the outer portions of said spikes travel when said conveying wheel is rotated.

2. In a fish scaling machine, a series of scale-removing elements arranged to successively remove the scales from different portions of the body of a fish so as to conjointly act to remove the scales from all parts of the body of the fish, means for conveying the fish to be scaled to and past the successive scale-removing elements, said last-named means comprising a power driven rotary conveying wheel mounted above said scale-removing elements and provided with radial fish impaling spikes, said scale-removing elements being disposed in an arcuate portion of a circular path in which the outer portions of said spikes travel when said conveying wheel is rotated, and means to strip the fish from said spikes after being operated upon by the last of said series of scale-removing elements.

3. In a fish scaling machine, a feed plate, an inclined trough extending downwardly from said feed plate, a pair of power driven rotary scale-removing elements arranged at the lower end of said trough in position to remove the scales from the lower side portions of the body of the fish to be scaled, yieldable means for pressing the fish downwardly into engagement with said scale-removing elements, another power driven rotary scale-removing element arranged to operate upon the fish after being operated upon by the first-named scale-removing element and so as to remove scales from the lower intermediate portion of the body of the fish, yieldable means for pressing the fish downwardly into engagement with the second-named scale-removing element, further scale-removing elements arranged to operate upon the fish after being operated upon by the second-named scale-removing element and so as to remove the scales from the upper intermediate portion of the body of the fish, yieldable means for sustaining the fish and pressing it upwardly into engagement with the last-named scale-removing element, still further scale-removing elements arranged to operate upon the fish after being operated upon by the third-named scale-removing element and so as to remove the scales from the upper side portions of the body of the fish, yieldable means for sustaining the fish and pressing it into engagement with the last-named scale-removing element, and means for conveying the fish to and past the successive scale-removing elements.

4. In a fish scaling machine, a feed plate, an inclined trough extending downwardly from said feed plate, a pair of power driven rotary scale-removing elements arranged at the lower end of said trough in position to remove the scales from the lower side portions of the body of the fish to be scaled, yieldable means for pressing the fish downwardly into engagement with said scale-removing elements, another power driven rotary scale-removing element arranged to operate upon the fish after being operated upon by the first-named scale-removing element and so as to remove scales from the lower intermediate portion of the body of the fish, yieldable means for pressing the fish downwardly into engagement with the second-named scale-removing element, further scale-removing elements arranged to operate upon the fish after being operated upon by the second-named scale-removing element and so as to remove the scales from the upper intermediate portion of the body of the fish, yieldable means for sustaining the fish and pressing it upwardly into engagement with the last-named scale-removing element, still further scale-removing elements arranged to operate upon the fish after being operated upon by the third-named scale-removing element and so as to remove the scales from the upper side portions of the body of the fish, yieldable means for sustaining the fish and pressing it into engagement with the last-named scale-removing element, and means for conveying the fish to and past the successive scale-removing elements, said last-named means comprising a power driven rotary conveying wheel having radial fish impaling spikes.

5. In a fish scaling machine, a feed plate, an inclined trough extending downwardly from said feed plate, a pair of power driven rotary scale-removing elements arranged at the lower end of said trough in position to remove the scales from the lower side portions of the body of the fish to be scaled, yieldable means for pressing the fish downwardly into engagement with said scale-removing elements, another power driven rotary scale-removing element arranged to operate upon the fish after being operated upon by the first-named scale-removing element and so as to remove scales from the lower intermediate portion of the body of the fish, yieldable means for pressing the fish downwardly into engagement with the second-named scale-removing element, further scale-removing elements arranged to operate upon the fish after being operated upon by the second-named scale-removing element and so as to remove the scales from the upper intermediate portion of the body of the fish, yieldable means for sustaining the fish and pressing it upwardly into engagement with the last-named scale-removing element, still further scale-removing elements arranged to operate upon the fish after being operated upon by the third-named scale-removing element and so as to remove the scales from the upper side portions of the body of the fish, yieldable means for sustaining the fish and pressing it into engagement with the last-named scale-removing element, and means for conveying the fish to and past the successive scale-removing elements, said last-named means comprising a power driven rotary conveying wheel having radial fish impaling spikes, the yieldable means for pressing the fish downwardly into engagement with the first and second-named scale-removing elements comprising spaced members between which the spikes of said conveying wheel may pass.

6. In a fish scaling machine, a feed plate, an inclined trough extending downwardly from said feed plate, a pair of power driven rotary scale-removing elements arranged at the lower end of said trough in position to remove the scales from the lower side portions of the body of the fish to be scaled, yieldable means for pressing the fish downwardly into engagement with said scale-removing elements, another power driven rotary scale-removing element arranged to operate upon the fish after being operated upon by the first-named scale-removing element and so as to remove scales from the lower intermediate portion of the body of the fish, yieldable means for pressing the fish downwardly into engagement with the second-named scale-removing element, further scale-removing elements arranged to operate upon the fish after being operated upon by the second-named scale-removing element and so as to remove the scales from the upper intermediate portion of the body of the fish, yieldable means for sustaining the fish and pressing it upwardly into engagement with the last-named scale-removing element, still further scale-removing elements arranged to operate upon the fish after being operated upon by the third-named scale-removing element and so as to remove the scales from the upper side portions of the body of the fish, yieldable means for sustaining the fish and pressing it into engagement with the last-named scale-removing element, means for conveying the fish to and past the successive scale-removing elements, said last-named means comprising a power driven rotary conveying wheel having radial fish impaling spikes, the yieldable means for pressing the fish downwardly into engagement with the first and second-named scale-removing elements comprising spaced members between which the spikes of said conveying wheel may pass, and means for stripping the scaled fish from the spikes of said conveying wheel.

7. In a fish scaling machine, a feed plate, an inclined trough extending downwardly from said feed plate, a pair of power driven rotary scale-removing elements arranged at the lower end of said trough in position to remove the scales from the lower side portions of the body of the fish to be scaled, yieldable means for pressing the fish downwardly into engagement with said scale-removing elements, another power driven rotary scale-removing element arranged to operate upon the fish after being operated upon by the first-named scale-removing element and so as to remove scales from the lower intermediate portion of the body of the fish, yieldable means for pressing the fish downwardly into engagement with the second-named scale-removing element, further scale-removing elements arranged to operate upon the fish after being operated upon by the second-named scale-removing element and so as to remove the scales from the upper intermediate portion of the body of the fish, yieldable means for sustaining the fish and pressing it upwardly into engagement with the last-named scale-removing element, still further scale-removing elements arranged to operate upon the fish after being operated upon by the third-named scale-removing element and so as to remove the scales from the upper side portions of the body of the fish, yieldable means for sustaining the fish and pressing it into engagement with the last-named scale-removing element, and means for conveying the fish to and past the successive scale-removing elements, a driving motor for each scale-removing element having an inwardly projecting power shaft, each scale-removing element comprising a toothed cylinder secured on the inwardly projecting power shaft of the associated motor.

SAMUEL M. GODFREY.